United States Patent [19]

Darling et al.

[11] 4,283,264
[45] Aug. 11, 1981

[54] ELECTROLYTIC CELL SEPARATOR, TUBULAR MEMBER COMPONENT THEREOF AND METHODS FOR MANUFACTURING AND USING SUCH SEPARATOR AND COMPONENT

[75] Inventors: Richard D. Darling, Youngstown; Christine A. Lazarz, Niagara Falls, both of N.Y.

[73] Assignee: Hooker Chemicals & Plastics Corp., Niagara Falls, N.Y.

[21] Appl. No.: 75,489

[22] Filed: Sep. 14, 1979

[51] Int. Cl.³ .................... C25B 9/00; C25B 13/02; C25B 13/08; B29D 23/10
[52] U.S. Cl. .................................... 204/252; 204/282; 204/295; 204/296; 204/301; 156/308.4; 156/218; 429/139
[58] Field of Search ...................... 204/252–258, 204/263–266, 295–296, 301, 283, 282; 156/308.4, 218; 429/139

[56] References Cited

U.S. PATENT DOCUMENTS

| | | |
|---|---|---|
| 1,490,332 | 4/1924 | Lavine . |
| 1,856,218 | 5/1932 | Knowles . |
| 3,878,082 | 4/1975 | Gokhale .................... 204/252 X |
| 3,923,630 | 12/1975 | Argade et al. .................. 204/252 X |
| 3,944,477 | 3/1976 | Argade .......................... 204/252 X |
| 3,960,697 | 6/1976 | Kircher et al. .................. 204/252 |
| 3,980,544 | 9/1976 | Adams et al. .................. 204/253 X |
| 4,076,571 | 2/1978 | Specht et al. .................. 204/296 X |
| 4,156,639 | 5/1979 | Vallance et al. .................. 204/252 |
| 4,175,024 | 11/1979 | Darlington et al. .................. 204/252 |
| 4,197,206 | 4/1980 | Karn .............................. 204/253 X |
| 4,217,200 | 8/1980 | Kedem et al. .................. 204/296 X |
| 4,218,275 | 8/1980 | Kadija et al. .................. 429/139 X |
| 4,219,394 | 8/1980 | Babinsky et al. .................. 204/296 X |

FOREIGN PATENT DOCUMENTS

2855837 7/1979 Fed. Rep. of Germany .......... 204/252

*Primary Examiner*—Donald R. Valentine
*Attorney, Agent, or Firm*—Howard M. Ellis

[57] ABSTRACT

A separator for an electrolytic cell or similar cell is made of a porous polymeric material, preferably porous polytetrafluoroethylene, and comprises a plurality of tubular portions of such material with one or two flange(s) at end(s) thereof for sealing to other such flanges and to the cell. The flanges are so constructed that when being sealed in place they do not strain or tear and do not strain or tear the material of the tubular portions. The separator is especially useful as a replacement for deposited asbestos diaphragms in electrolytic cells for the manufacture of chlorine and caustic.

32 Claims, 9 Drawing Figures

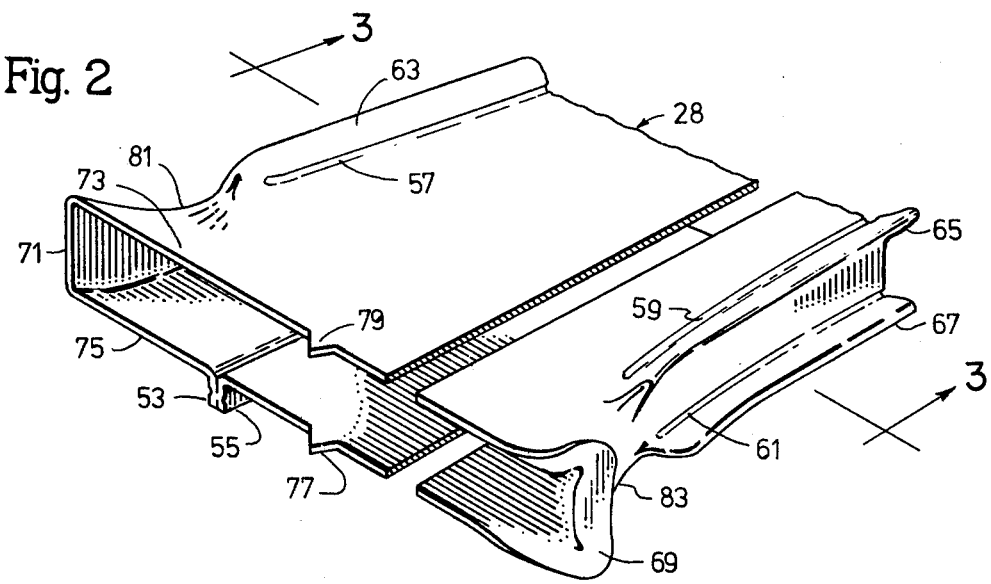
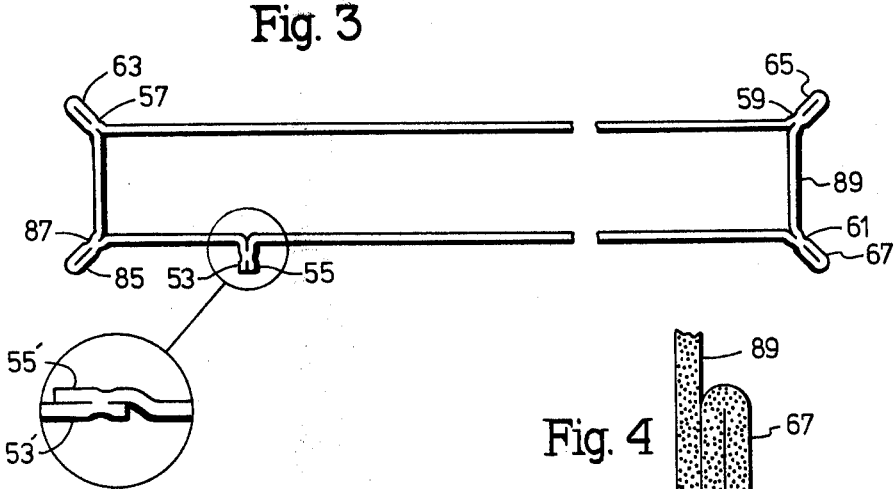
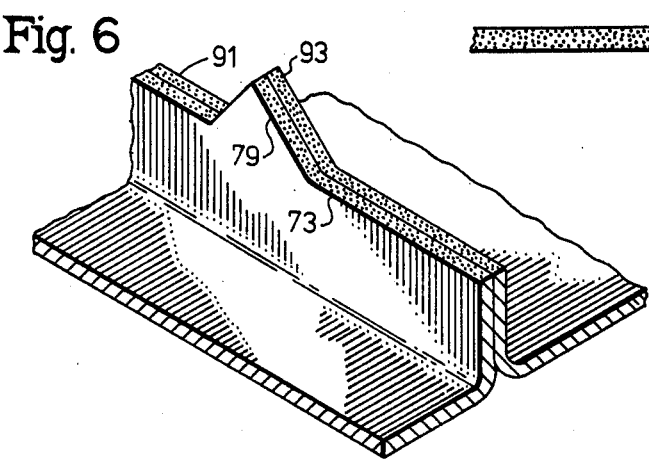

ELECTROLYTIC CELL SEPARATOR, TUBULAR MEMBER COMPONENT THEREOF AND METHODS FOR MANUFACTURING AND USING SUCH SEPARATOR AND COMPONENT

This invention relates to a novel separator for electrolytic and other cells, in which the separator keeps different liquids (and gases) apart or controls transmission of one liquid to another. More particularly, the invention relates to a separator of a particular structure, especially useful in electrolytic cells for the manufacture of chlorine and sodium hydroxide, which is more easily and effectively incorporated in such a cell and, because of its construction, is less likely than various other separators to be strained or torn during installation and use.

Diaphragm cells have long been used for the manufacture of chlorine and caustic. In such cells the anolyte and catholyte have previously been separated by a diaphragm of deposited asbestos fibers, usually on a wire mesh cathode structure. In recent years such diaphragms have sometimes been replaced by ion-permeable membranes or porous separators. Of the porous separators, those which are microporous and made from polytetrafluoroethylene are gaining increased favor. Various constructions for such separators have been suggested but in many of these the separators are subjected to tension, and because of this they may fail in use. Some such separators are difficult to install, sometimes leading to concealed tears or strains, which subsequently cause diminished efficiency of cell operations. The present separators, component parts used in their manufacture and methods of making such components and the separators, possess significant advantages over the prior art separators, membranes, diaphragms and methods, the most significant of which is in the ready construction, from a single piece of thermoplastic microporous separator material, of a separator tube which may be readily sealed, as by heat sealing, to other such tubes, to form a flanged separator for an electrolytic cell or other "similar" apparatus, without causing undue strain on the separating material.

In a search of the prior art the following patents were found: Nos. 1,490,332; 1,856,218; 3,878,082; 3,923,630; 3,944,477; 3,960,697; and 4,076,571. U.S. Pat. No. 1,490,332 (Levin) describes a woven asbestos diaphragm having a circumferential tuck in the material thereof which extends circumferentially between the top and bottom of the diaphragm. The inventive concept described is to allow for vertical movement of the diaphragm, caused by the pull of gravity, without straining the diaphragm material. U.S. Pat. No. 1,856,218 (Knowles) discloses a double walled asbestos sleeve for an end electrode of an electrolytic cell. U.S. Pat. No. 3,878,082 (Gokhale) describes a preformed sheet diaphragm of a chemically inert and electrically non-conducting thermoplastic polymer (polytetrafluoroethylene is mentioned), held in place on a cathode by a U-shaped or crescent-shaped elastomeric or elastopolymeric retainer. U.S. Pat. Nos. 3,923,630 (Argade et al.) and 3,944,477 (Argade) also relate to porous polytetrafluoroethylene diaphragms, the former being for a continuous belt diaphragm and the latter being for a porous sheet diaphragm which may be laid over the cathode and then snugly fitted along the frame edge by a friction clip. U.S. Pat. No. 3,960,697 (Kircher et al.) describes a protective cover or net for a diaphragm material, such as deposited asbestos. Finally, U.S. Pat. No. 4,076,571 (Specht et al.) teaches restoration of elasticity to heat sealed portions of an electrolytic diaphragm and incidentally mentions formation of an envelope by heat sealing together sections of diaphragm material at edges thereof. In the installation of such a diaphragm an envelope is formed of the diaphragm material and is slipped over an electrode, after which the envelope may be closed by clamping means. From the description of the prior art noted it will be clear that although porous polytetrafluoroethylene diaphragms are known and it has been suggested to pre-form them and assemble the pre-formed diaphragms or separators over electrodes and seal them in place, it is not known to make by applicants' process and to utilize a structure of such a separator, which will have flanges thereon for fastening to a cell wall or other part or to a retainer structure, without placing undue strain on the separator material.

In accordance with the present invention a separator for an electrolytic cell having a plurality of aligned cathodes and anodes therein comprises a plurality of tubes of separator material, each of which is longitudinally pleated for up to about the height of the cathodes and less pleated or unpleated at an end thereof and each of which is joined at said end to adjacent such tubes and includes a flange portion to provide flange sealing of the separator to the cell at such end. Considered more broadly, the separator is contemplated as being useful in various other types of cells in which one liquid is being maintained separate from another, and is composed of tubes having flanged portions on at least one end thereof, which are continuous where they communicate with the tube and which are of sufficient size and shape so as to be sealable to the cell or other holding structure without being unduly strained and without tearing the tubes or the flanges, especially where they meet. Also within the invention are the flanged tubes used in making the separators, the methods of manufacture of such tubes and of the separators, electrolytic cells containing them and the utilization of such separators, often in replacement of asbestos diaphragms, in electrolytic cells.

The invention will be readily understood from the accompanying description in this specification, taken together with the drawing in which:

FIG. 2 is a perspective view of a portion of a tubular member of this invention, suitable for joinder to other such members to make the invented separator, illustrating the pleating thereof to produce an unstressed flange at an end thereof;

FIG. 3 is a sectional view along plane 3—3 of FIG. 2 and includes an enlarged alternate sealing construction for the circled portion thereof;

FIG. 4 is an enlarged sectional view of a corner portion of the tube of FIGS. 2 and 3, showing the folding into place of excess material thereof;

FIG. 5 is an enlarged sectional view of a corner portion of the tube of FIGS. 2-4, with the excess pleat trimmed off;

FIG. 6 is an enlarged partially sectioned perspective view of a portion of an end of an "envelope" shown in FIG. 1, with alignment of indicator points being illustrated;

Figure 1:
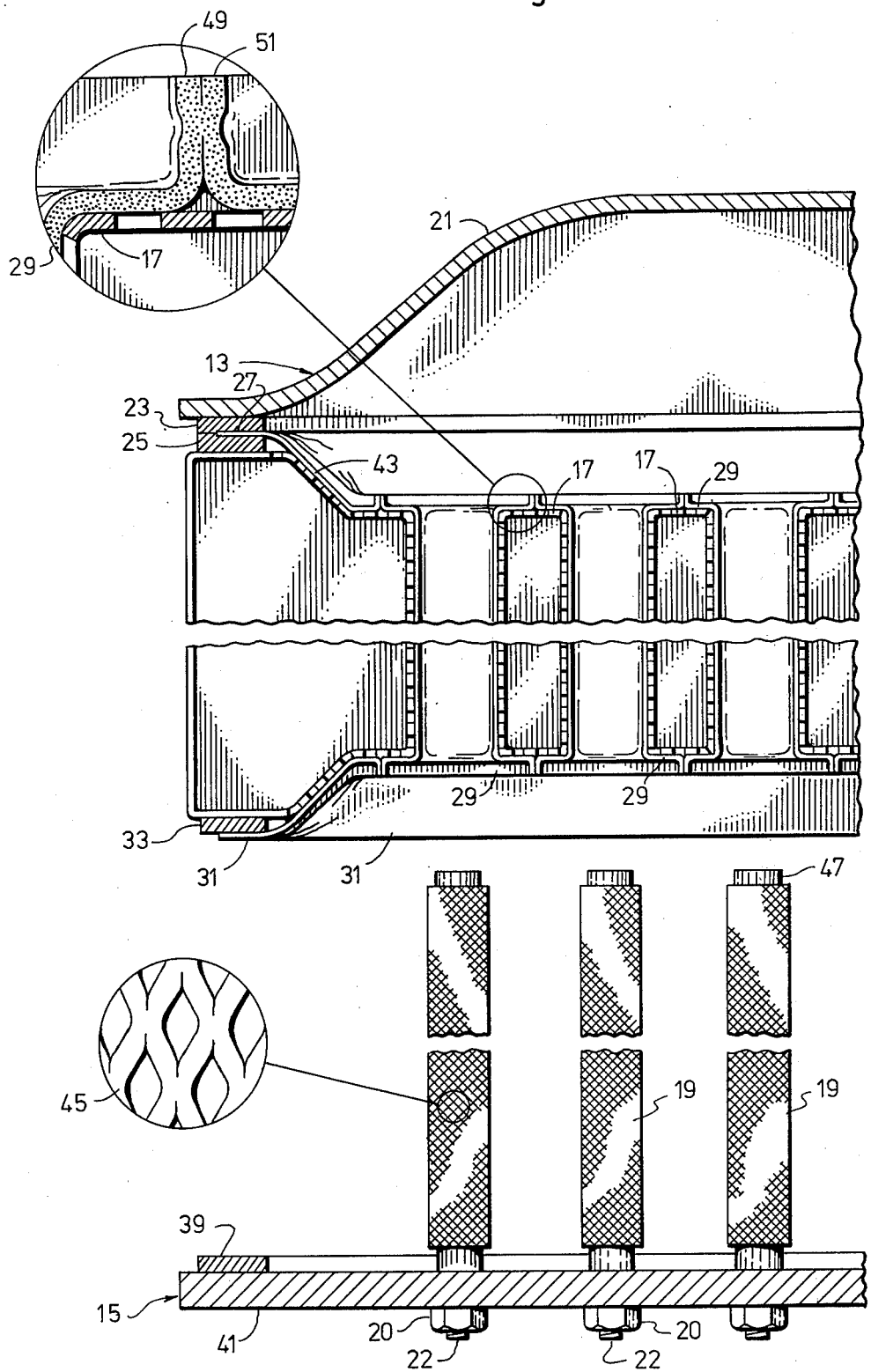
FIG. 1 is a disassembled partial vertical sectional view, with parts thereof enlarged, of a portion of an electrolytic cell in which the catholyte is maintained separate from the anolyte by a separator of this invention.
Figure 7:
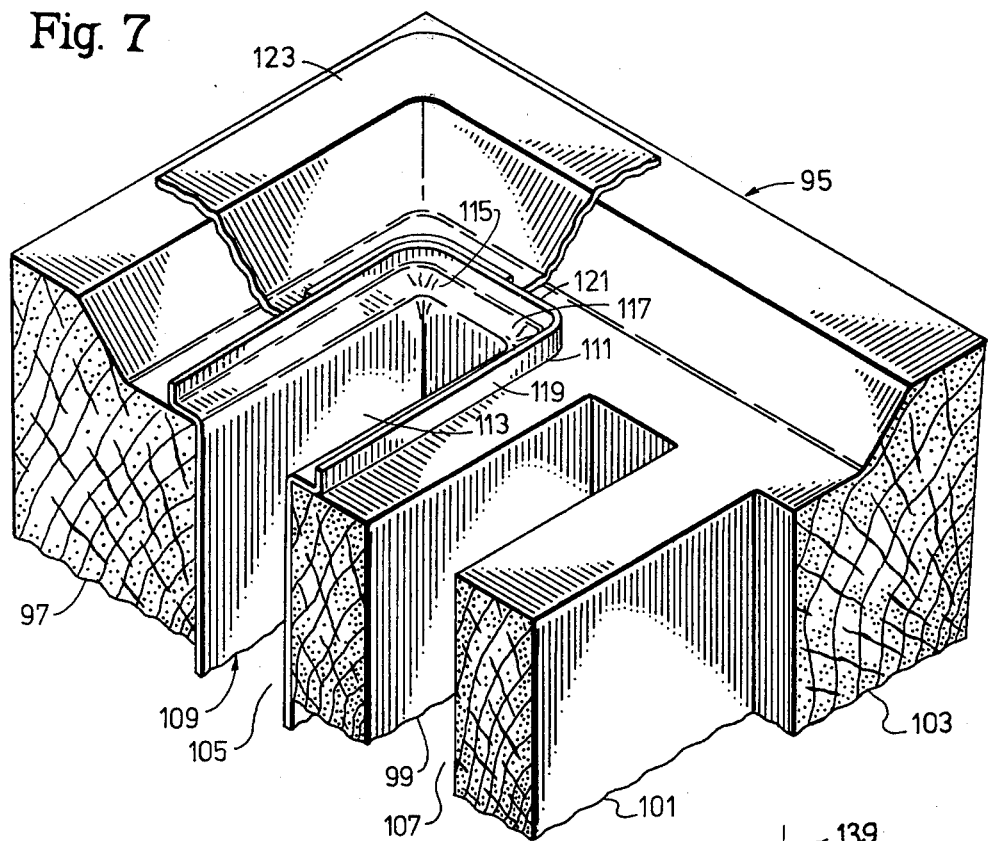
FIG. 7 is a perspective view of a portion of a forming frame used to make the separators of this invention, with a tube of such a separator in position therein, showing how it may be joined to additional gasketing or sealing means.

In FIG. 1 are shown parts of upper and lower sections 13 and 15, respectively, of an electrolytic cell suitable for the manufacture of chlorine and caustic. As illustrated, the cathodes 17 are above the anodes 19 and the anodes 19 are held to the cell bottom by nuts 20 and studs 22 but it is within the invention to utilize other cell constructions, such as those wherein the cathodes may be held to various portions of the cell and the anodes may be side entering. Of course, in such cases the construction of the separator of this invention and its insertion into the cell may be modified accordingly. Upper cell section 13 includes a cover 21, peripheral sealing gaskets 23 and 25, upper peripheral sealing flange 27 between the sealing gaskets, separator 29, shown around cathodes 17, lower peripheral sealing flange 31 and gasket 33. When the cell is sealed closed, by sealing means, not shown, base 41 and cover 21, at the peripheries thereof, are forced toward each other, making effective peripheral seals with gaskets 23, 25, 33 and 39 and with seals 27 and 31, so that the anolyte is maintained separate from the catholyte by the present separators. If desired the gaskets may include matching "peripheral" beads and channels to promote even better sealings. The anolyte and catholyte are communicated with inlet and outlet lines and with chambers and/or manifolds, which are known in the art and are not illustrated herein. At the ends of the electrolytic cells separator material 43 may be employed as part of flange or seal 27 to cover the last cathode portion. One formation of the sealing portion of the separator assembly and a side seal for it is shown in FIG. 7.

In one circled portion of FIG. 1, illustrating a part of the anode, the active anode surface 45 is shown as of expanded metal but screening, wire meshes and other materials may also be utilized. While the anode is preferably of the dimensionally stable type, such as ruthenium oxide on titanium, often with titanium coated copper conducting rod bases 47, other types of anodes may also be used. In the enlarged view of the circled portion of the upper part of the cell, cathode 17 is shown as an expanded metal cathode, usually of iron or steel, but other materials and structures may also be employed. About the cathode is the separator 29, made from two "halves" of two separate tubes of this invention, sealed together (preferably by heat sealing) at extensions 49 and 51 thereof.

In FIG. 2 is shown a part of a tube of this invention. Such tubes are joined together to make the invented separators. Tube 28 is shown made from a sheet of microporous polymeric material, preferably polytetrafluoroethylene, heat sealed together at ends 53 and 55 thereof. The tube, positioned horizontally instead of vertically in the illustration, is shown heat sealed or otherwise suitably sealed (as by fusion, cementing or polymerization) continuously at locations 57, 59 and 61, corresponding, with another such location, to sides, faces or edges of a cathode about which a portion of a separator made from two such tubes will be positioned. The fastening of the portions of the walls of tube 28 together, as illustrated, results in additional material or pleatings at locations 63, 65 and 67 and permits the formation of the flanged portion 69 at an end or ends of the tube for puckering and fastening to a cell part or wall to prevent leakage of the anolyte into the catholyte, while allowing controlled electrolyte passage or flux through the pores of the major surfaces, sides and ends of the porous separator. Side 71 of tube 28 is shown as it appears before being folded over into a flange corresponding to that shown at 69. Similarly, end portions 73 and 75 are shown unfolded. Points 77 and 79 are provided for alignment of portions of the tubes and separators during installation, to prevent skewing thereof and resulting undesirable strains. They are also useful for aligning the tube portions to be joined together to make the separator. Heat sealed locations 57, 59 and 61 and the unseen such location (shown in FIG. 3) may be augmented by additional such fastenings to provide other pleats but it is most desirable that such be at or near the sides of the tube and separator corresponding to the corners or edges of the electrode about which the tube is to be formed into a separator portion. Instead of continuously joining such sides the heat sealing or other fastenings may be discontinuous and other fastening means such as fusion, polymerizable material (cements) and staples and stitches may be employed, provided that they are leak-free. Thus, staples (or stitches) may be used in conjunction with cements, adhesives, etc., to fill the holes made. The important consideration is that the puckerable portions, such as those illustrated at 81 and 83, should be sufficient so that the material at the ends, corresponding to locations 69, 71, 73 and 75, should be enough to form the desired separator ends with unstrained flanged portions for affixing to the adjacent such tube end and to the cell to prevent leakage between anolyte and catholyte.

In FIG. 3 pleats 63, 65, 67 and 85 are shown, together with the corresponding heat seals 57, 59, 61 and 87 (or other appropriate fastening means). In the supplementary circled portion of this figure another mechanism for heat sealing together the ends of a sheet of porous material to form a tube is illustrated, wherein ends 53' and 55' are lapped instead of butted and are heat sealed together. Although the butted joint of FIG. 3 is preferred one may also utilize flat butts. FIG. 4 illustrates the folding over of end or pleat portion 67 onto side 89 of tube 28. The other pleats may be similarly folded onto the corresponding sides (normally preferred) or onto the faces adjoining, whichever is most convenient for insertion into the electrolytic cell. They may be held in such positions by appropriate sealing means, heat sealing being preferred, or may, when appropriate, be unfastened. In some instances, as when sealing along the lines represented by numerals 57, 59, 61 and 87 is continuous, as shown, so that electrolyte will not leak past, any excess of the material, represented at 63, 65, 67 and 85, may be removed. This is shown in FIG. 5. However, such is not normally necessary and sometimes may be undesirable, as it represents an additional operation and a source of possible leakage, should the pleating seals be imperfect.

In FIG. 6 joining together of edge 73 at corresponding point 79 with similar parts 91 and 93 of another tube is shown. Such joining is like that of FIG. 1, illustrated in the enlarged circular portion thereof, and is made in such manner that the separator portion thereby formed can satisfactorily cover the cathode without being strained, stretched or torn. Thus, due to the pleatings made, the puckered portions of the tubes at the end(s) thereof will provide sufficient extra material to close the separator end(s) so as to encase the cathode and will leave enough material at the cathode sides to make a desired seal, as shown at 69 in FIG. 2 and at 117 in FIG. 7.

In FIG. 7 form 95 (for making the separators before cell installations), made out of wood or other suitable material, is shown to include vertical members 97, 99, 101 and 103, with openings 105 and 107 between members 97, 99 and 103, and 99, 101 and 103, respectively. In place between members 97, 99 and 103 and bounding opening 105 is tube 109 of this invention, including flange 111 and tubular portion 113. The pleats that generate the puckering mechanism are not shown but numerals 115 and 117 represent puckering creases. Vertical parts 99 and 101 of the wooden form simulate cathodes and flange portion 119 is for joining to a corresponding portion of another tube (not shown) inserted in opening 107, as per FIG. 1. Similarly, flange portion 121 contacts member 123, a seal, or a cell part, against which sealing may be made. Sealing member 123 is preferably heat sealed to the separator made by sealing together the various tubes but it is possible to manufacture the separators of this invention without such sealing member. For example, the puckered parts of the tubes can be extended to replace the circumferential sealing members, and sometimes they may also replace the appropriate gaskets. Usually, however, the peripheral sealing members 123 are used and are held tightly in place in the cells by suitable gaskets or other means, not illustrated in this figure, to prevent leakage between anolyte and catholyte compartments.

Figure 8:
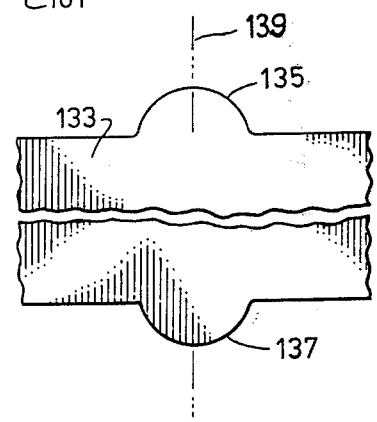
FIG. 8 is a fragmentary view of a sheet of porous material with rounded extensions thereon for forming corner flanges of separators.

Although the preferred embodiment of the invention has been shown in FIGS. 1–7 it is recognized that other ways of providing suitable flanges on tubular separator components may also be utilized. Thus, as shown in FIG. 8, sheet 133 may have extensions at 135 and 137, corresponding to end flange portions. Phantom line 139 indicates mid-end, corresponding to such a location of the appropriate electrode where a seal is to be made.

Figure 9:
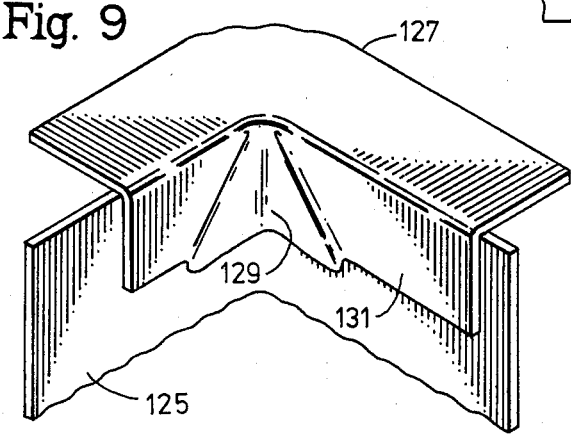
FIG. 9 is a partial sectional view of a flanged tube portion wherein the flange part is nonintegral with the tube structure but is joined to it.

As is shown in FIG. 9 a separator tube may be made from a straight walled tube 125 and a flanged member 127, folded and puckered at corner 129, so as to form a wall portion 131, joinable to wall 125. Such construction avoids the employment of the excess pleated material of the apparatuses of FIGS. 1–7 but relies for sealing on good heat sealing or other joinder of parts 125 and 131. It should be noted that imperfections in the sealings along the edges of tube 28 will not generate leaks in the separator made from it (unless excessive heat sealing is utilized so as to create holes in the porous polymeric separator material) and the separators made depend only on good seals along the top and bottom seaming lines and not around corners of the tubes. Thus, the pleated and puckered structures are superior in this respect.

The illustrated invention, described in detail above, is most preferably applicable in electrolytic cells, especially those utilized for the manufacture of chlorine and caustic. Although such cells are of various types, in all of them it is important that the anolyte be separated from the catholyte and that slight, limited and preferably controlled movement of anolyte into the catholyte be maintained. The present structure, as described, may be used in such cells and it will be apparent to those of skill in the art how to modify the structure, manufacturing methods and uses of the present invention so as to make it applicable to different types of chlorine-caustic and other electrolytic cells. Among the chlor-alkali cells are the Hooker-type diaphragm cells, e.g., the Hooker type H-4 cells, and the Diamond-type cells, e.g., the DS-85 cells, in both of which the present separators may be used in replacement of asbestos diaphragms. In addition to electrolytic cells the invention is also useful with respect to various other types of liquid-liquid processing apparatuses. For example, it may be employed in fuel cells, diffusional apparatuses, osmotic cells and various other types of cells and apparatuses and in such, when appropriate, it may be mounted over electrodes or another suitable support or, in some instances, may be substantially "free standing" but sealed and held at a flange thereof. With respect to chlorine-caustic electrolytic cells, the separators will usually be enclosing the cathodes but it is also contemplated that they may be mounted over the anodes, although such is normally not a preferred aspect of the invention.

The porous separators, while preferably of porous polytetrafluoroethylene, such as is descried in some of the prior art patents previously mentioned, will preferably be of the types disclosed in U.S. patent applications Ser. Nos. 891,987, filed Mar. 31, 1978; 957,515, filed Nov. 3, 1978; 064,615, filed Aug. 7 1979; and 64,616, filed Aug. 7, 1979. Although they may not be as satisfactory in some instances, it is also possible to utilize the porous polymeric materials described in U.S. Pat. Nos. 3,281,511 and 3,556,161. In addition to microporous polytetrafluoroethylene and other porous fluoropolymers, in sheet form, which are considered to be most suitable for the present separators, largely because of their chemical resistances to the harsh environments of chlorine-caustic cells, other porous, especially microporous polymers may also be employed under suitable conditions, including polyethylenes, polypropylenes, polychloro-lower alkylenes, polyurethanes, polyvinyl halides, rubbers, especially polychloroprene, and other synthetic organic polymers capable of forming the desired porous structures. The structures mentioned preferably include tortuous paths between communicating micron-sized or similarly sized pores.

The PTFE (such designation is being employed to refer to polytetrafluoroethylene but it will be understood that other porous polymeric materials may be used in place thereof) sheet may have been made on rolls of a desired length to correspond to the height of the cathode (or other "support" for the present separators) plus additional material needed for the flanges but usually the rolls will be further oversized and the material will be trimmed. The rolled sheets that normally result will then be cut to desired length, allowing for pleatings so as to provide for the flanges for subsequent sealings. Alternatively, the rolled material may be fitted about a form and the desired extra material for the pleats may be allowed for when cutting the microporous PTFE sheet to length. The sheet resulting is then sealed together at ends thereof to make a desired cylinder and the pleats are longitudinally incorporated in such cylinder, as by heat sealing. While straight and continuous pleats or straight line discontinuous pleatings may be preferable and the pleats will normally be of the same width, it is within the invention to utilize curved or otherwise positioned pleats and to make them of different sizes. Also, while four pleats are highly preferable for the described tubes, for use in the described cells, and will be located at or near the sides or edges of the tube, corresponding to such locations on a cathode, other numbers of pleats may be employed, e.g., 2 to 200, depending on electrode designs. Preferably such number will be 2 to 16 or 4 to 8. Once the sizes of the tubes are known for a particular application, pleating may be effected before formation of the tube and even before cutting of the roll or cast sheet to length, if desired. Similarly, the sheet, tube or finished separator may be made wettable (for better electrolysis) at any suitable time prior to use. Thus, the particular orders in which the various steps of the manufacturing processes are carried out are not considered to be critical and in this description and in the appended claims variations in the orders may be made without going outside the invention or the scopes of the claims.

After formation of a plurality of pleated tubes, such may be inserted in an electrolytic cell from which the anodes have been removed, or preferably, in a form having smooth walls, which is designed to resemble such a cell and to facilitate the manufacture of the separators of this invention. Points on the ends of the separator tubes, such as are illustrated in FIG'S. 2 and 6, may be present to facilitate proper alignments of the tubes in the cell or form and to facilitate proper alignments for fastening to other such tubes. Such points may be cut off after assembly or after installation of the separator, if desired. However, it may be preferable to retain them, to detect any position shifts and to assist in aligning the separator if it is removed and reinstalled. The tubes are inserted in the form, aligned and sealed together with adjoining tubes, as previously described. Then, the manufactured separator is removed from the form and is carefully installed in an electrolytic cell. The flanges remaining at the closed ends of the separator tubes may be fastened or sealed in place and subsequently the other ends of the tubes may be sealed and the flanges adjacent to them may be fastened in place. In a different embodiment of the invention, before installation of the separator in the cell, a peripheral flange seal is joined to it and after the installation a similar flange at the other end of the separator may be installed after closing off of the tubes and may be sealed in place in the cell. The described sealings to adjacent tubes and/or to peripheral flanges are preferably by heat sealing but other mechanisms, including clamping devices, sometimes can be used. The various flange or seal materials are preferably PTFE but other thermoplastics, e.g., chlorinated PVC, may also be employed, and thermosets are useful in appropriate circumstances, e.g., when cemented. The flange, seal and separator materials may be different, if desired, e.g., chlorinated PVC flange portions, PTFE microporous separator portions and PVC peripheral seals. In some instances the described flanges may be dispensed with at one end of the separator, with the extended walls of the tubes merely being fastened together so as to fit about the particular electrode.

Before making the described tubes the sheets may be manufactured on rollers which are so shaped as to produce a tube of greater "diameter" at the ends thereof than at a mid-portion, so that it may fit a cell electrode and provide for the desired sealing flanges without the need for pleatings. Similarly, the PTFE sheets may be rolled to other desired shapes. However, for simplicity of construction it is preferred to utilize the pleating method and although it is preferred that the flange portions be unpleated, it is within the invention to make them partially pleated. The pleatings employed will preferably be located at the sides of the separators so that they may be folded over and sealed, as shown in FIG. 4, and will not interfere unduly with electrolytic action.

Installation of the separator in a cell should be undertaken with care so that the material of the separator is not damaged by contact with the electrodes between which it is being inserted. For the most part, the leading flanged portions will protect the following tubular portions of the separator but in rare instances the separator might become torn, weakened or otherwise damaged. Such damage is more likely to occur at the leading flange or in the tube portion near the flange. If the separator does become damaged some material of the flange, such as the excess puckered material indicated at 115 and 117 of FIG. 7, may be removed therefrom and used as a patch, to be cemented or preferably heat sealed, over a rip, which might occur at the end of the tail extending from numeral 113 in FIG. 7 or at the tail end extending from numeral 111 in the same figure, for examples. If there is insufficient overlap after removal of such material from the puckers, material at such puckers may be re-sealed together, preferably by heat sealing, to prevent any leakage.

In installation of the present separators in replacement of an asbestos diaphragm, such as a deposited asbestos diaphragm in an electrolytic chlorine-caustic cell, the cathode assembly is removed, the asbestos is removed from the cathodes, the separator, previously sealed at one end thereof, is installed and sealed in place at the other end, the cathode assembly is re-installed, the separator is sealed at the other end over the cathodes and the cell is closed up, with the flanged separator ends and/or peripheral seal means being held in place between the peripheral gaskets (or suitable cell parts). Of course, the orders of such operations may be changed without departing from the invention, as described and claimed herein. The important consideration with respect to the flanged portions of the tubes and separators of this invention is that the flanges do not unduly strain the material of the tubes and separators when they are positioned over the cathode or a form simulating such cathode (or matching part) and when they are sealed to the cell portion adjacent thereto to seal off the cathodes and catholyte from the anolyte.

Another important aspect of the present invention is in the insertion of the tubes into position in the cell (and the form) in such manner as to diminish the chance of tearing the separator material. That material, while not being especially sensitive to tearing, is of a structure which should not be damaged in installation because such could result in excessive electrolyte transmission through the micropores, if they were unduly enlarged. By the present method of installation the tube is inserted through a comparatively large opening and after sealing off at one end or otherwise being held in place, it may be drawn closely against the cathode surface, so that subsequent insertion past the anodes can be effected without undue contact with the separator and without any resulting damage to it. If desired, insertion can be facilitated by folding the flanged portions back into the tube or out over it and this helps to rigidify the tube and helps to maintain the tube shape during advancement thereof. In prior art methods of assembly, wherein an envelope of a separator material enveloping an anode would be inserted with the anode between the cathodes, there would be a greater chance of damage to the separator. One reason for this difference is that the covered anodes, if covered with the separator in such a way as to allow a little extra material for expansion or contraction, might tend to have such material snag on an electrode surface whereas by the practice of the present method sufficient tension could be maintained on the separator during the installation to avoid such contact and then the membrane could be relaxed somewhat before sealing, if desired.

The described general method of installing the separators of this invention may also be applied when the flanges at the ends of the tubes and separators are like that shown in FIG. 9, with puckering being at the corners of the flanges where they are sealed to the tubes. Similarly, they can be made from sheets like that of FIG. 8. Such tubes and flanges, when made into separators similar to those previously described, will have lesser tendencies to be strained and to tear and rip because of stretchings thereof, such as would occur if ordinary tubes were to be formed into flange portions for sealing to other such tubes and to the cell. To relieve such stresses one might cut the tubes at the end sections or corners but such openings created would allow leakage, unless covered by additional material, as by heat sealing another layer of microporous separator material or other suitable material onto the tube and flange portions affected.

After installation of the present separators the electrolytic cell made may comprise a plurality of anodes and cathodes in alternating arrangement, separated by a microporous polymeric separator into anolyte and catholyte compartments, with the separator encasing the plurality of anodes or plurality of cathodes and being fastened to the electrolytic cell structure by means of a peripheral sealing flange or a plurality of flange portions at an end thereof which, when fastened in place, does not strain or tear the separator material and has no cuts or openings in it for direct passage of electrolyte or gas through it. Such cell is employable for the manufacture of chlorine and caustic. Other types of cells, with liquid separators like those of this invention and with unstrained flange members thereon, may also be employed. Such cells, like the electrolytic cells, may have vertical or horizontal inclinations or mixtures thereof, may have movable or stationary electrodes, may have separators joined to the cell by flanges at one or both ends thereof and may be structurally varied in other ways, so long as insertion of the described separators can be effected as taught herein.

By use of the present invention there may be obtained electrolytic and other types of cells wherein the described separators replace diaphragms or ion-active membranes. In the electrolytic cells this results in effective, current-efficient production of sodium hydroxide and chlorine from brine without use of asbestos and without excessive periodic replacements of membranes. When such replacements are required, which may be every year or two (or even more, because sometimes the separators may be left in place and may be renovated in place), replacements are comparatively simple and are effected in a manner like that previously described for installations. Due to the unstrained flange portions and due to the method of insertion of the separators and the separator tubes in the cells and in the forms, little damage is done during installation and few repairs are needed. Yet, when repairs are indicated they are easily carried out.

In the production of chlorine and caustic, when separators of the types shown in FIGS. 1-7 and of material described in Ser. No. 064,615 are employed in replacement of asbestos, as previously described, in Hooker H-4 cells, with cell anodes of titanium mesh covered with ruthenium oxide and cathodes which are perforated steel plates, and the cells are operated, utilizing a brine having a sodium chloride concentration of about 320 g./l., a pH of about 4 and a cell temperature of about 95° C., at a voltage of about 3.5 and a current density of about 0.2 ampere/sq. cm., to produce caustic at a concentration of about 150 g./l., satisfactory current efficiency and kilowatt hours per electrochemical unit are obtainable without the need to replace the separators more than every six months. The separators utilized are those which may be made by the methods described in U.S. patent application Ser. No. 064,615, in Example 1 thereof. The separator material described will preferably be of a thickness of about 0.8 mm., if of a single layer, and about 2 mm. if of a composite. Normally the thickness will be in the range of 0.2 to 3.5 mm. and the porosity thereof will be from 70 to 90%. The A, $B_1$ and $B_2$ X-ray ratios will also preferably be in the ranges described in Ser. No. 064,615.

In operation of the electrolytic cells mentioned, usually acceptable conditions may be employed. Thus, the cell voltage will normally be between 2.5 and 6 volts and the current density will normally be in the range of 0.1 to 0.3 ampere/sq. cm. The brine will normally contain from 250 to 350 g./l. sodium chloride and the sodium hydroxide solution produced will usually be at a concentration of from 90 to 210 g./l. Cell temperatures will generally be from 50° to 98° C. and the pH will be from about 4 to 11.

In variations of the invention, when a rip or tear or strain occurs during the assembly or manufacture of a tube or separator, that part is repaired by heat sealing thereon a portion of the thermoplastic material from the flange that is unneeded to make a good seal. The resulting separator operates as well as the one used in the above-described process. Similarly, the separator of the invention is used to replace an asbestos diaphragm in a Hooker cell in the manner previously described and the process then practiced is as effective and efficient as or more effective and efficient than that wherein the asbestos diaphragm is employed. In the described assemblies the points are aligned to eliminate skewing and to minimize strains. Also, the tubes, separators and cells employed are those shown in the drawing and described in the foregoing specification.

This invention has been described with respect to specific illustrations and embodiments thereof but it is not to be limited to them because one of skill in the art, with the present application before him, will be able to utilize substitutes and equivalents without departing from the invention.

What is claimed is:

1. A method of manufacturing a separator for an electrolytic cell having a plurality of aligned cathodes and anodes therein which comprises converting a homogeneous sheet of separator material into at least one tube which is open ended, of a height greater than that of the cell cathodes and having multiple longitudinal pleats extending up to about the height of the cathode and less pleated or unpleated at (an) end(s) thereof, placing a plurality of such tubes adjacent to each other in a form which simulates the plurality of aligned cathodes of the electrolytic cell or placing them between the cell cathodes so that an end or ends of each thereof extend(s) beyond the form or the cathodes, forming flanges for the tubes from the separator material at the less pleated or unpleated end or ends thereof and sealing by contacting together parts of such ends from halves of two separators tubes adjacent the same cathode or form so as to make a separator for such cathode between it and adjacent anodes when installed in the electrolytic cell, and providing for flange sealing of such separator to the cell.

2. A method according to claim 1 wherein the separator tubes are longitudinally pleated for about the height of the cathodes, the ends thereof are unpleated and the unpleated ends extend beyond the form or the cathodes.

3. A method according to claim 2 wherein the separator tubes are positioned between simulated cathode volumes of the form and the longitudinal pleating is at a plurality of locations corresponding to sides or edges of the cathodes.

4. A method according to claim 3 wherein the separator tubes are joined together by heat sealing.

5. A method according to claim 4 wherein the separator is made in a form, is removed from the form, is installed in an electrolytic cell over the cathodes thereof and is sealed in place in such cell.

6. A method according to claim 5 wherein the separator material is a porous polytetrafluoroethylene sheet which is cut to a plurality of rectangular pieces which are converted to tubular form.

7. A method according to claim 6 wherein after installation of the separator in the electrolytic cell an opening which results from a rip or tear or an imperfection in the material thereof which could allow uncontrolled leakage between anolyte and catholyte in the cell, is repaired by heat sealing over such opening or imperfection a portion of separator material from a flange portion thereof.

8. A homogeneous porous polymeric tubular member, suitable for conversion with other such tubular members into a separator for an electrolytic cell, which comprises an open ended tube of a height greater than that of the cell cathodes, said tubular members having multiple longitudinal pleats for up to about the height of the cathodes and less pleated or unpleated at the ends thereof, so that the less pleated or unpleated portion of the tube may be utilized to form a flange for sealing by contacting together flanges of other such tubes and to the electrolytic cell.

9. A tubular member according to claim 8 in which the open ended tube is longitudinally pleated at a plurality of locations corresponding to sides or edges of cathodes about which such tubular member is intended for installation.

10. A tubular member according to claim 9 wherein the material of the tube is a porous polytetrafluoroethylene sheet.

11. A tube according to claim 10 having an integral flange portion at both ends thereof for sealing the tube to other such tubes and to an electrolytic cell at both ends of the tube.

12. A separator for an electrolytic cell having a plurality of aligned cathodes and anodes therein which comprises a plurality of tubes of homogeneous separator material, each of which has multiple longitudinal pleats for up to about the height of the cathodes and less pleated or unpleated at an end thereof and each of which is joined together at said end by contacting halves of two separator tubes and includes a flange portion for puckered flange sealing of the separator to the cell directly or to a peripheral sealing flange at such end.

13. A separator according to claim 12 wherein the longitudinal pleating of each of the tubes is at a plurality of locations corresponding to sides or edges of cathodes about which the separator is intended for installation.

14. A separator according to claim 13 made of porous polytetrafluoroethylene sheet material.

15. A separator according to claim 14 in which the tubes thereof have integral flange portions at both ends for sealing the separator to the electrolytic cell at both ends of the separator at puckered flanges thereof.

16. A porous tubular member, suitable for conversion with other such tubular members into a separator for use in electrolytic cells, chlor-alkali cells fuel cells, diffusional cells or osmotic cells, which comprises an open ended porous polytetrafluoroethylene tubular portion with a polytetrafluoroethylene flange at at least one end thereof for sealing the tube to other such tubes and to an electrolytic cell, said tubular portion of the tubular member being of a height corresponding to that of a cell electrode or mount and of such size as to fit such electrode or mount and the flange portion being continuous where it communicates with the tubular portion and being of sufficient size and of such shape as to be sealable to flanges of adjacent such tubes for use in such a cell and for sealing to such a cell or to a peripheral sealing flange thereof without straining or tearing such tubular portion or the flange, said flanges of adjacent tubes having projections or points at at least one end thereof to assist in aligning the tubes.

17. A tubular member according to claim 16 having flanges of porous polytetrafluoroethylene at both ends of the tubular portion thereof.

18. A porous separator suitable for use in electrolytic cells, chlor-alkali cells fuel cells, diffusional cells or osmotic cells, which comprises a plurality of porous homogeneous polytetrafluoroethylene tubular members, each of which includes an open ended polytetrafluoroethylene tubular portion with a polytetrafluoroethylene flange at at least one end thereof, said flange(s) having projections or points to assist in aligning adjacent tubes which flanges are sealed to corresponding flanges of such other adjacent tubes and are sealable to an electrolytic cell, said separator tubular portions being of such size as to fit electrodes or mounting members in the cell and the flange portion of each tube being continuous where it communicates with the tubular portion and of sufficient size and of such shape as to be sealable to the cell without straining or tearing the tubular portions or the flanges.

19. A separator according to claim 18 wherein flanges of porous polytetrafluoroethylene are present at both ends of the tube and the separator is adapted for use covering the cathodes of an electrolytic cell and separating such cathodes from corresponding anodes.

20. A method of manufacturing a porous separator, suitable for use in electrolytic cells, chloro-alkali cells fuel cells, diffusional or osmotic cells, which comprises cutting to a suitable length a homogeneous sheet of porous separator material, sealing together the cut ends of such sheet to form a tube, inserting such tube longitudinally in a form or between electrodes or mounting members of a cell so that at least one end of the tube projects past the form, electrodes or mounting members and joining such projecting end to such an end of another tube in said form or cell, said projecting ends being formed from the separator material and include protrusions of points to assist in aligning adjacent tubes.

21. A method according to claim 20 wherein the tube is at least partially pleated so as to provide extra material for the flange at the end thereof so that it may be mounted in the cell without straining or tearing 22. A method according to claim 21 wherein flange portions are at both ends of the tube, the tube and flange portions are of porous tetrafluoroethylene polymer and the extra flange material is sufficient for puckered sealing mounting of the flange in the cell.

23. A method of converting a diaphragm cell having asbestos diaphragms therein to a cell utilizing a porous polytetrafluoroethylene separator which includes a plurality of tubes of homogeneous separator material, each of which has multiple longitudinal pleats for up to about the height of the cathodes of the cell and less pleated or unpleated at the ends thereof and each of which is joined at an end to ends of adjacent such tubes and includes a flange portion of polytetrafluoroethylene to provide flange sealing of the separator to the cell, which comprises removing the cathodes from the electrolytic cell, removing the asbestos diaphragms from the cathodes, installing the separator in position about the cathodes thereof, positioning the cathodes in the cell and sealing off the anode compartments from the cathode compartments by sealing by contacting together adjacent portions of the flanges from halves of two separators at at least one end of each of the tubes and by sealing off other parts of the flanges at such ends to the cell.

24. A method according to claim 23 wherein the diaphragm cell having asbestos diaphragms therein is a chlor-alkali cell.

25. A method according to claim 24 wherein the chlor-alkali diaphragm cell having asbestos diaphragms therein is a Hooker-type chlor-alkali cell.

26. An electrolytic cell comprising a plurality of anodes and cathodes in alternating arrangement, separated by a microporous polymeric separator into anolyte and catholyte compartments, said separator encasing a plurality of the anodes or a plurality of the cathodes and being fastened to the electrolytic cell structure by means of a flange at an end thereof which, when fastened in place, does not strain or tear the separator material and has no cuts or openings in it for direct passage of the electrolyte or gas through it, said flange having projection(s) or point(s) to assist in aligning the separator in the cell.

27. An electrolytic cell according to claim 26 which is a chlor-alkali cell.

28. An electrolytic cell according to claim 27 which is of the Hooker type, with the microporous polymeric separator separating the cell into anolyte and catholyte compartments in place of a plurality of asbestos diaphragms on the cathodes.

29. A method of manufacturing a separator for an electrolytic cell having a plurality of aligned cathodes and anodes therein which comprises converting a sheet of separator material into at least one tube which is open ended, of a height greater than that of the cell cathodes, longitudinally pleated for up to about the height of the cathode and less pleated or unpleated at (an) end(s) thereof, placing a plurality of such tubes adjacent to each other in a form which simulates the plurality of aligned cathodes of the electrolytic cell or placing them between the cell cathodes so that an end or ends of each thereof extend(s) beyond the form or the cathodes, forming flanges for the tubes at the less pleated or unpleated end or ends thereof, said flanges having projections or points to assist in aligning the tubes in the cell, and sealing together parts of such ends from tubes adjacent the same cathode so as to make a separator for such cathode between it and adjacent anodes when installed in the electrolytic cell, and providing for flange sealing of such separator to the cell.

30. A method according to claim 1 wherein the tubes are pointed at both ends thereof and the pointed portions of adjacent tubes are aligned before sealing such tubes together.

31. A porous polymeric tubular member, suitable for conversion with other such tubular members into a separator for an electrolytic cell, which comprises an open ended tube of a height greater than that of the cell cathodes, longitudinally pleated for up to about the height of the cathodes and less pleated or unpleated at the ends thereof, so that the less pleated or unpleated portion may be utilized to form a flange with projections or points for aligning and sealing the tube to other such tubes and to the electrolytic cell.

32. A separator for an electrolytic cell having a plurality of aligned cathodes and anodes therein which comprises a plurality of tubes of separator material, each of which is longitudinally pleated for up to about the height of the cathodes and less pleated or unpleated at an end thereof and each of which is joined at said end to adjacent tubes and includes a flange portion with projections or points for alignment with said adjacent tubes, said flange portion for puckered flange sealing of the separator to the cell directly or to a peripheral sealing flange at such end.

* * * * *